Aug. 27, 1968  K. ZENKNER  3,398,882
CROSSFLOW BLOWER
Filed March 29, 1966  2 Sheets-Sheet 1
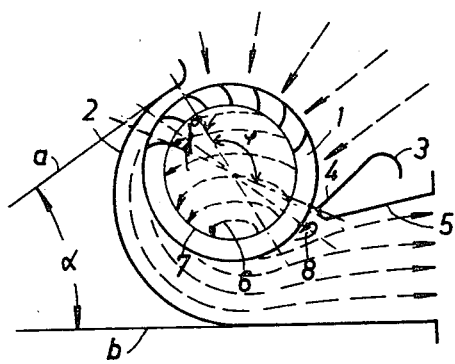
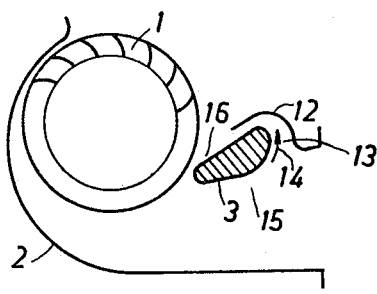
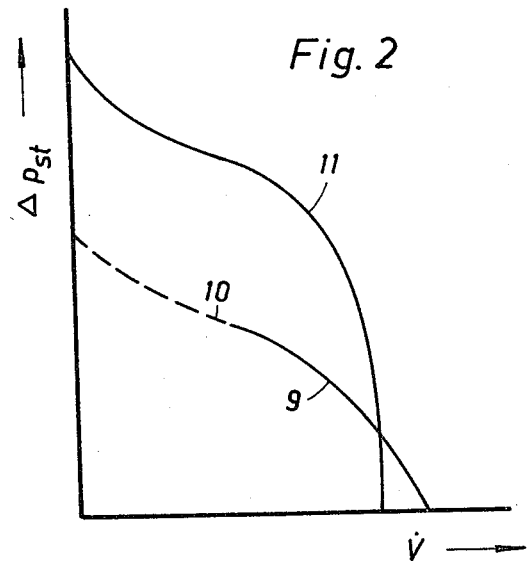
INVENTOR
KURT ZENKNER.
BY *Otto John Munz*
ATTORNEY Aug. 27, 1968  K. ZENKNER  3,398,882
CROSSFLOW BLOWER Filed March 29, 1966  2 Sheets-Sheet 2

INVENTOR

KURT ZENKNER.

BY *Otto John Munz*

ATTORNEY 3,398,882
CROSSFLOW BLOWER
Kurt Zenkner, Quellenstrasse 22, Grunwettersbach,
Karlsruhe, Germany
Filed Mar. 29, 1966, Ser. No. 538,311
Claims priority, application Germany, Mar. 30, 1965,
Z 11,443
10 Claims. (Cl. 230—125)

ABSTRACT OF THE DISCLOSURE

A crossflow blower having a guide sheet continually receding in a spiral from an impeller, the point of closest approach of the sheet to the impeller being at the inlet of the blower. A vortex tongue separates the inlet side of the blower from the outlet side. The vortex tongue approaches the impeller and the gap between the tongue and the impeller decreases in the direction opposite to that of the circumferential rotation of the impeller. The angle between the tangent to the guide sheet at the blower inlet and the tangent to the guide sheet at the blower outlet is less than 90°. The vortex tongue has a wedge angle between 10 and 60° and a return flow channel is provided around the vortex tongue to return air from the pressure to the suction side of the blower.

---

Figure 4:
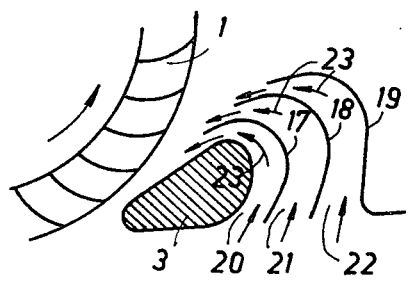

The invention refers to a crossflow blower and more particularly to a crossflow blower having a rotatable impeller wheel, a guide sheet for guiding the air flow and a vortex forming tongue separating the incoming air from the outgoing air.

It is an object of the invention to provide a blower of the general character described which is highly stable in its behaviour.

Another object of the invention consists in to provide a blower of the kind here in question which has a characteristic curve directed almost vertically over a great portion of its length.

A further object of the invention consists in to provide a blower of the aforementioned kind which is characterized by the following facts:

(a) Behind the inlet opening as viewed in the direction of flow the distance between the said guide sheet and the periphery of the impeller wheel increases continuously and gradually so that it gradually gets the form of a spiral;

(b) The tangent to the guide sheet on its beginning or on its starting point or the tangent to the said guide sheet on inversion point or on the point of inflexion on the side of the inlet opening and the tangent to the wall portion of the said guide sheet defining the outlet area of the blower enclose between them an angle which is considerably smaller than 90 deg. and lies preferably between 30 and 60 deg.;

(c) The vortex forming tongue consists of two legs forming together an angle lying between 10 deg. and 60 deg.;

(d) The gap between the leg of the vortex forming tongue facing the suction side and the periphery of the impeller wheel diminishes in the direction towards the vortex and contrary to the sense of rotation;

(e) To the impeller wheel there are associated flow guide means for guiding the air flow which participate in forming a return channel diminishing from the pressure side to the suction side through which the air flow leaving the impeller wheel is partly conducted back from the pressure side to the suction side.

A still further object of the invention consists in to provide a blower of the aforementioned type in which the guide sheet has the purpose of stabilizing the flow at different throttling stages, whereas the vortex forming tongue guarantees within the range of high speeds minimum streams occurring in the center of the vortex or eddy.

These and other objects, features and advantages of the present invention will become further apparent from the following detailed description thereof, whereby in the drawings several embodiments of the invention are shown in schematical views.

In FIG. 1 there is shown a high stability crossflow blower consisting of a rotor or impeller wheel 1, a guide sheet 2 surrounding the rotor along a great portion of its periphery, and a narrow wedge-like vortex forming tongue 3 that has the purpose to separate the entering air from the outgoing air. It is characteristical for the flowing conditions within such a crossflow blower that in any throttling stage the vortex or eddy zone within the rotor or the so-called deflecting center 6 lie close to the inner circle of the blades in the neighbourhood of the outlet area 7. In the outlet area 7 of the blower there takes birth also a turning center or a so-called "deadwater"-zone 8, which, however, may become instable with regard to its position with a stage of the flow between high throttling and medium throttling, an instable working of the crossflow blower being the consequence of such a state of things.

The FIG. 2 shows the diagrammatic characteristic curve of crossflow blowers, whereby the volume of the flow passing through the blower is represented on the abscissa, whereas the statical pressure $P_{st}$ is represented on the ordinate. The zone 10 of the characteristic line 9 indicating the instable working is thereby represented by dotted lines.

The purpose of the invention is to obtain with crossflow blowers of the above said category a stable characteristic curve or line and to so increase the capacity of the blowers to produce pressure as is demonstrated, for example, by the indicating or characteristic curve or line 11 in FIG. 2. From the drawings it can be taken that with the new blower behind the inlet opening as viewed in the direction of flow the distance of the guide sheet of the new blower from the periphery of the impeller wheel increases gradually and continuously so that it gradually gets the form of a spiral, whereby the distance—as measured in direction of the radius—between the guide sheet and the periphery of the impeller wheel steadily gets greater and greater from the inlet opening or the inversion point or point of inflexion on the side of the inlet opening towards the outlet of the blower. The second fact that can be taken from the drawings is that the tangent to the guide sheet at its beginning or starting point or at the inversion point or point of inflexion on the side of the inlet opening—and the tangent to the wall portion of the guide sheet defining the outlet area enclose between them an angle that is considerably smaller than 90 deg., varying preferably between 30 and 60 deg.; the third fact that can be taken from the drawings is that the vortex forming tongue consists of two legs forming or enclosing an angle of about 10 to 60 deg., whereby the gap between the leg of the vortex forming tongue facing the suction zone and the periphery of the impeller wheel diminishes towards the vortex or eddy and contrary to the sense of rotation.

It is moreover provided in accordance with the invention that the vortex forming tongue eventually forms together with additional means a return channel through which a branched off air stream is partly led back from the pressure side to the suction side, by which branched off air stream the exterior dead water zone is prevented from instationarily drifting away.

The return channel may be formed by means of a small guide sheet held at a certain distance from the vortex forming tongue. If desired, there can be provided also a series of small guide sheets placed one after another and constituting together an assembly having the shape of a wedge. Advantageously, the return channels may diminish in cross-section in the direction from the pressure side to the suction side. These channels may, moreover, have a small outlet cross section that can be changed or varied by turning or pivoting the guide sheets. Furthermore, to the entrance or inlet opening of the return channels there may be associated a slide to vary the cross-section of the said opening. In case the return channel is constituted by means of the vortex forming tongue, this latter forms with its legs and with the walls connected therewith a cavity, whereby the leg facing the pressure side has openings and the leg facing the suction side has slits which are arranged with respect to one another like the steps of a staircase.

Furthermore, it is convenient to so design the guide sheet 2 that the angle between the inlet tangent $a$ and the outlet tangent $b$ of the guide sheet enveloping the impeller sheet is substantially smaller than 90 deg.

With the embodiment of a cross stream blower according to FIG. 3, the wedge-shaped body constituting a separate body closed on all sides and representing the vortex forming tongue 3 is so surrounded by a small curved guide sheet 12 that a channel 13 is obtained to convey a branched off air stream 14 from the pressure side 15 to the suction side 16 of the blower.

In FIG. 4, several guide sheets 17, 18, 19 are arranged behind each other so as to form a wedge-like assembly so that channels 20, 21, 22 are obtained to convey the branched off air streams 23.

Figure 5:
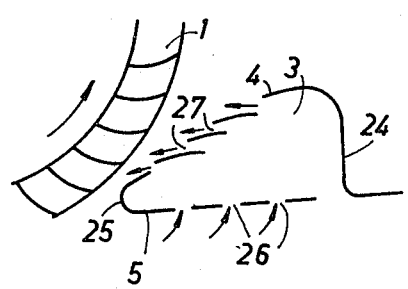

In accordance with FIG. 5 the return channel is constituted by the vortex forming tongue itself. This latter is constituted by the sheet legs 4, 5 and the sheet walls 24, 25 constituting together a hollow body closed on all sides. The lower sheet leg 5 thereof is provided with openings 26 and the upper sheet leg 4 thereof is provided with slits 27 associated to each other like the steps of a staircase.

Another feature characterizing the highly stabilized crossflow blower or fan consists in that the volume of flow of the branched off stream of air may be varied by changing the cross section of the channel. Thus, there is another possibility to vary the characteristic features of the blower or fan so that the blower or fan can be adapted to all possibilities.

Figure 6:
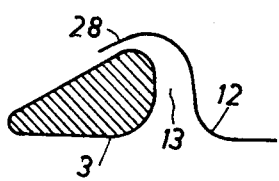
Figure 7:
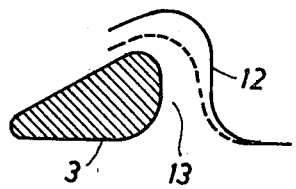

In FIG. 6 there is shown a return channel 13 with a narrow outlet cross-section 28 between the upper side of the vortex forming tongue 3 and the guide sheet 12. In FIG. 7, this cross section of the outlet 28 may be increased by pivoting the guide sheet 12.

Figure 8:
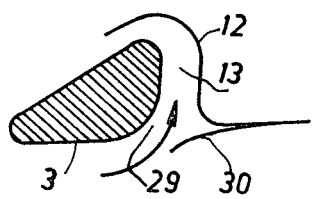

As shown in FIG. 8, a change of the volume of the branched off air stream can be obtained by means of a slide 30 by the displacement of which the cross section of the inlet opening 29 of the return channel 13 is changed. It is also possible to pivot the wedge-like body of the vortex forming tongue.

From the drawings it can be taken that with the blower according to the invention the central angle $\varphi$ opened towards the suction side of the blower is smaller than 180 deg., said central angle $\varphi$ being contained between two diameters, the one of which goes through the point of inflexion on the side of the inlet opening or through the starting point of the guide sheet, whereas the other one goes through the point on the periphery of the impeller that is closest, i.e., has the minimum distance to the vortex forming tongue. Further, it is to be seen that the central angle $\gamma$, measured in the sense of the rotation or inversely, may vary between 5 and 60 deg. This central angle $\gamma$ is contained between two diameters, the one going through the beginning of the guide sheet or the point of inflexion on the side of the inlet opening, the other one going through the tip of the vortex forming tongue.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A crossflow blower comprising in combination: a drum-like impeller wheel closed on its axial ends and rotatable about a central axis; a guide sheet on one side of the periphery of the said impeller wheel and surrounding and enclosing the said impeller wheel along a substantial portion of its periphery, said guide sheet serving to guide the flow; a vortex forming tongue on the side of the periphery of the said impeller wheel opposite to the said guide sheet and serving to separate the air which comes in from that which is blown out; the distance between the periphery of the said impeller wheel and the said guide sheet increasing gradually and continuously after the inlet as viewed in the direction of flow, said guide sheet assuming gradually a spiral form; the tangent to the starting point of the guide sheet at the inlet and the tangent touching the wall portion of the guide sheet defining the outlet area constituting together an angle which is considerably smaller than 90 deg.; said vortex forming tongue being wedge-shaped and having two legs forming with each other an angle of between 10 and 60 deg., the gap between the leg of the vortex forming tongue facing the suction side and the periphery of the impeller wheel diminishing in a direction towards the vortex and contrary to the sense of rotation; flow guide means associated with said impeller wheel to form a converging return channel through which a portion of the air stream leaving the impeller wheel is led back from the pressure side to the suction side, the path of this air stream portion being from the pressure side, around said vortex tongue and into the gap between said impeller wheel and said vortex tongue, the movement of said air stream portion in said gap being directly into the periphery of the impeller wheel in the direction opposite to that of impeller rotation.

2. A blower in accordance with claim 1, wherein there is provided a small additional guide sheet arranged opposite the said vortex forming tongue and spaced apart therefrom at a certain distance, the said additional guide sheet and the said vortex forming tongue constituting together the flow guide means for said return channel.

3. A blower in accordance with claim 2, wherein there are provided several guide sheets which are arranged one behind the other and form together a wedge-shaped body, said guide sheets constituting return channels through which a portion of the air stream leaving the impeller wheel is led back from the pressure side to the suction side.

4. A blower in accordance with claim 1, wherein the return channel decreases in cross section from the pressure side to the suction side.

5. A blower in accordance with claim 2, wherein the return channel has a small outlet cross section, said outlet cross section being changeable by pivoting the said additional guide sheet.

6. A blower in accordance with claim 1, wherein to the inlet opening of the return channel there is allotted a slide said slide being so displaceable to and fro as to change the inlet cross section of the return channel.

7. A blower in accordance with claim 1, wherein the vortex forming tongue is a hollow body, its leg facing the pressure side being provided with openings and said leg facing the suction side being provided with slits situated in stepped arrangement with respect to one another.

8. A blower in accordance with claim 1, wherein the distance as measured in the direction of the impeller wheel radius between said guide sheet and said impeller wheel steadily and gradually increases from the inlet opening to the outlet of the blower.

9. A blower in accordance with claim 1, wherein the central angle opening towards the suction side of the blower and enclosed between the diameter passing through starting point of the said guide sheet at the inlet and the diameter passing through the point on the periphery of the impeller wheel that is at a minimum distance from the vortex forming tongue is smaller than 180 deg.

10. A blower in accordance with claim 1, wherein the central angle enclosed between the diameter passing through the starting point of said guide sheet at the inlet and the diameter passing through the tip of the vortex forming tongue lies between 5 and 60 deg.

References Cited

UNITED STATES PATENTS

| 3,161,348 | 12/1964 | Laing | 230—125 |
| 3,181,777 | 5/1965 | Coester | 230—125 |
| 3,325,089 | 6/1967 | Vogler | 230—125 |
| 3,209,989 | 10/1965 | Eck | 230—125 |

FOREIGN PATENTS

| 1,103,927 | 7/1955 | France. |
| 1,250,046 | 11/1960 | France. |
| 963,016 | 7/1964 | Great Britain. |

HENRY F. RADUAZO, *Primary Examiner.*